United States Patent [19]

Shiraishi et al.

[11] Patent Number: 5,142,404
[45] Date of Patent: Aug. 25, 1992

[54] OPTICAL UNIT FOR USE IN LASER BEAM PRINTER OR THE LIKE

[75] Inventors: Takashi Shiraishi; Ken Omura, both of Tokyo; Naruhito Yoshida; Masao Yamaguchi, both of Yokohama, all of Japan

[73] Assignee: Kabushiki Kaisha Toshiba, Kawasaki, Japan

[21] Appl. No.: 621,818

[22] Filed: Dec. 4, 1990

[30] Foreign Application Priority Data

Dec. 27, 1989 [JP] Japan .................................. 1-340932

[51] Int. Cl.$^5$ .............................................. G02B 26/10
[52] U.S. Cl. .................................... 359/217; 359/218; 250/236
[58] Field of Search ................. 359/216, 217, 22, 218, 359/219; 250/235, 236; 346/108

[56] References Cited

U.S. PATENT DOCUMENTS

| | | | |
|---|---|---|---|
| 4,560,862 | 12/1985 | Eastman et al. | 359/217 |
| 4,627,685 | 12/1986 | Sakuma | 359/217 |
| 4,758,059 | 7/1988 | Sakuma | 359/217 |
| 4,875,748 | 10/1989 | Matsumoto et al. | 359/216 |

FOREIGN PATENT DOCUMENTS

177512  7/1989  Japan .................................. 359/206

*Primary Examiner*—Loha Ben
*Attorney, Agent, or Firm*—Foley & Lardner

[57] ABSTRACT

In an optical unit used for a laser beam printer, a laser beam generated by a laser diode is converted by a group of conversion lenses into a laser beam having a predetermined-size cross section. The laser beam is directed toward a photosensitive body by a scanner, so as to scan the photosensitive body at a constant speed. A focusing lens allows the rotating angle of the reflecting faces of the scAnner to correspond to a desirable point on the surface of the photosensitive body. In other words, the rotating angle is made to correspond to the distance between the optical axis center determined with respect to a main scanning direction and a point to which the laser beam is irradiated for scanning. The focusing lens is arranged between the scanner and the photosensitive body and shapes the laser beam reflected by the scanner such that the laser beam has a desirable diameter. The focusing lens has a toric surface which is formed on the side closer to the scanner than the other and which is rotation-symmetric with reference to an axis extending in the main scanning direction. The cross sectional shape of the focusing lens is concave in a plane expanding in the main scanning direction and is convex in a plane expanding in a sub-scanning direction.

10 Claims, 12 Drawing Sheets

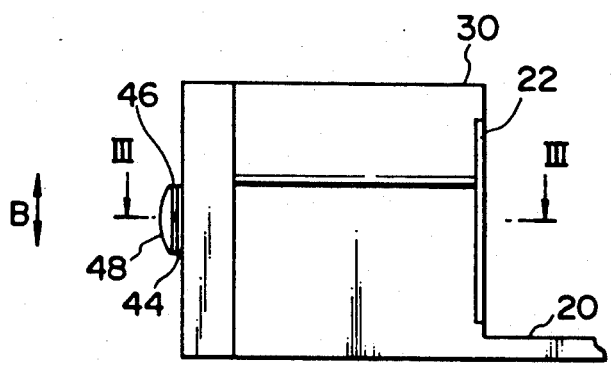
F I G. 3A
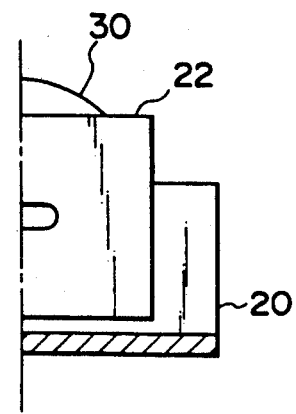
F I G. 3B
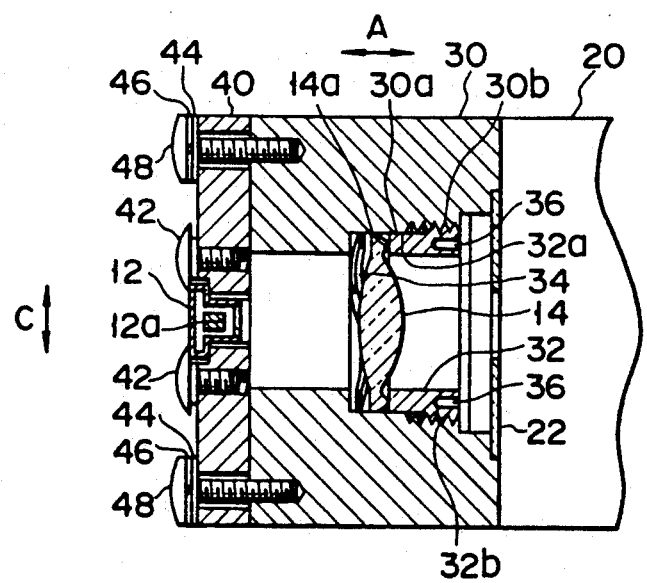
F I G. 3C

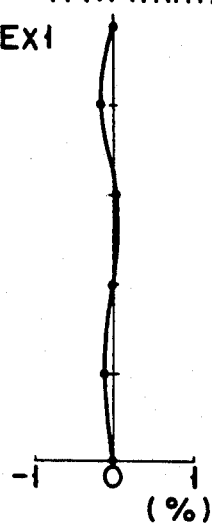 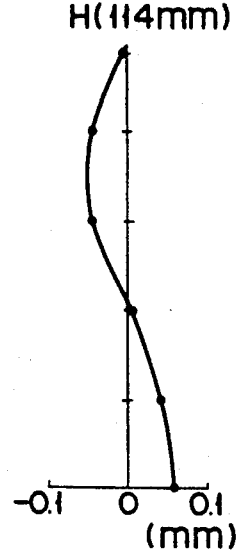 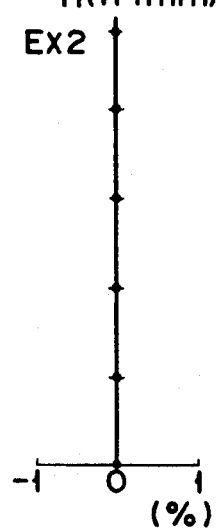 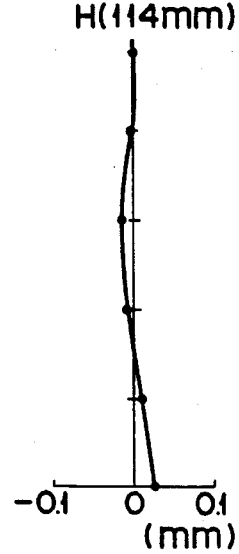
FIG. 12A  FIG. 12B  FIG. 12C  FIG. 12D
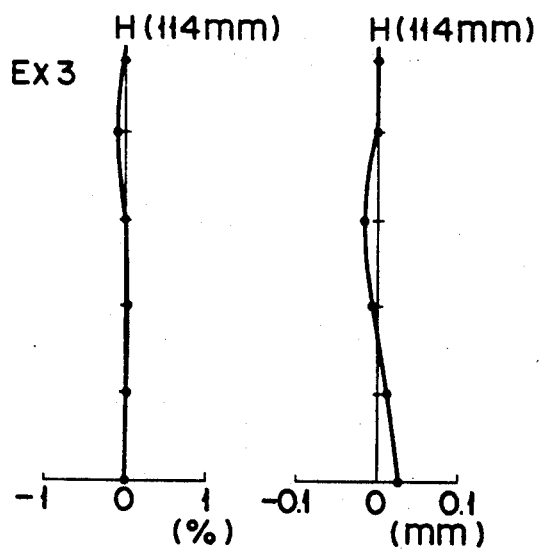
FIG. 12E  FIG. 12F

OPTICAL UNIT FOR USE IN LASER BEAM PRINTER OR THE LIKE

Background of the Invention

1. Field of the Invention

The present invention relates to an optical unit for use in a laser beam printer, and more particularly to an optical unit which guides a laser beam from a laser diode to a photosensitive body, by way of a group of focusing lenses and a scanner.

2. Description of the Related Art

In general, an optical unit incorporated in a laser beam printer or the like is designed such that a laser beam output from a laser diode is guided first to a scanner and then to a photosensitive body, i.e., an object to be scanned. The photosensitive body is scanned with the laser beam at the same speed. When guided from the laser diode to the photosensitive body, the laser beam passes through a group of focusing lenses. By these focusing lenses, the laser beam is made to have a cross sectional shape having desirable characteristics, and then fall on the predetermined position on the surface of the photosensitive body.

This type of optical unit is made up of first and second optical systems which are arranged isolated from each other. The first optical system converges the laser beam output from the laser diode, while the second optical system focuses the laser beam on the photosensitive body. The scanner is arranged between the first and second optical systems, as will be detailed later.

The first optical system is a combination of lenses, such as an aspheric surface glass lens, plastic lenses, etc. The second optical system is a combination of lenses, such as an fθ lens, etc. By this fθ lens, the rotation angle of the scanner is changed in proportion to the position at which the laser beam is focused on the photosensitive body and which is expressed in relation to the main scanning direction.

U.S. Pat. No. 4,627,685 discloses a scanner constituted by a polygonal mirror whose mirror pieces are convex cylinders in the main scanning direction. In the optical unit disclosed in the above U.S. Pat. No., the field curve of the laser beam or image focused on the photosensitive body can be reduced. However, no consideration is given to a variation in the cross sectional size of the laser beam guided to the photosensitive body and the fθ characteristic.

In this case, the fθ characteristic of the laser beam reflected from the mirror pieces must be adjusted to have a desired value. Furthermore, image frequency and a laser beam intensity must be controlled to have a uniform beam energy distribution in the main scanning direction.

SUMMARY OF THE INVENTION

Accordingly, an object of the present invention is to provide an optical unit which is to be incorporated in a laser beam printer or the like, allows easy correction of a variation in the position and cross sectional size of a laser beam focused on a photosensitive body and scans the photosensitive body with the laser beam at a uniform angular velocity.

Another object of the present invention is to provide an optical unit which allows easy correction of not only the field curve but also the fθ characteristic with reference to a photosensitive body.

A further object of the present invention is to provide an optical unit which is compact in size and can be manufactured at low cost by use of low-in-price members or parts.

The present invention provides an optical unit used for a printer apparatus comprising means, which includes a rotatable reflecting face curved in a main scanning direction, for reflecting a light beam toward an object to be scanned, and means, arranged between the reflecting means and the object to be scanned and having a toric surface which is rotation-symmetric with reference to an axis extending in the main scanning direction, for guiding the reflected light beam to the object in correspondence to the rotating angle of the reflecting face while simultaneously shaping the reflected light beam to have a cross section of a predetermined diameter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification. illustrate presently preferred embodiments of the invention, and together with the general description given above and the detailed description of the preferred embodiments given below, serve to explain the principles of the invention.

FIG. 3A is a side view of a lens barrel which is to be incorporated in the optical unit shown in FIGS. 1A and 1B and by which a focusing optical system, a light source, etc., are held;

FIG. 3B is a right side view of the lens barrel shown in FIG. 3A;

FIG. 3C is a sectional view taken along line III—III shown in FIG. 3A;

FIGS. 12A, 12C and 12E are graphs showing the $f\theta$ characteristics which the laser beam directed to a third plastic lens has in the optical units shown in FIGS. 1A and 1B, the $f\theta$ characteristics being obtained by carrying out simulations regarding an optimal position of the third plastic lens; and FIGS. 12B, 12D and 12F are graphs showing how the beam waist of a laser beam converged on a mirror face of a polygonal mirror varies in relation to the optimal position of the third plastic lens, the variations being obtained by carrying out similar simulations to those mentioned above.

DETAILED DESCRIPTION OF THE PREFERRED EMBODIMENTS

An embodiment of the present invention will now be described, with reference to the accompanying drawings.

Figure 1A:
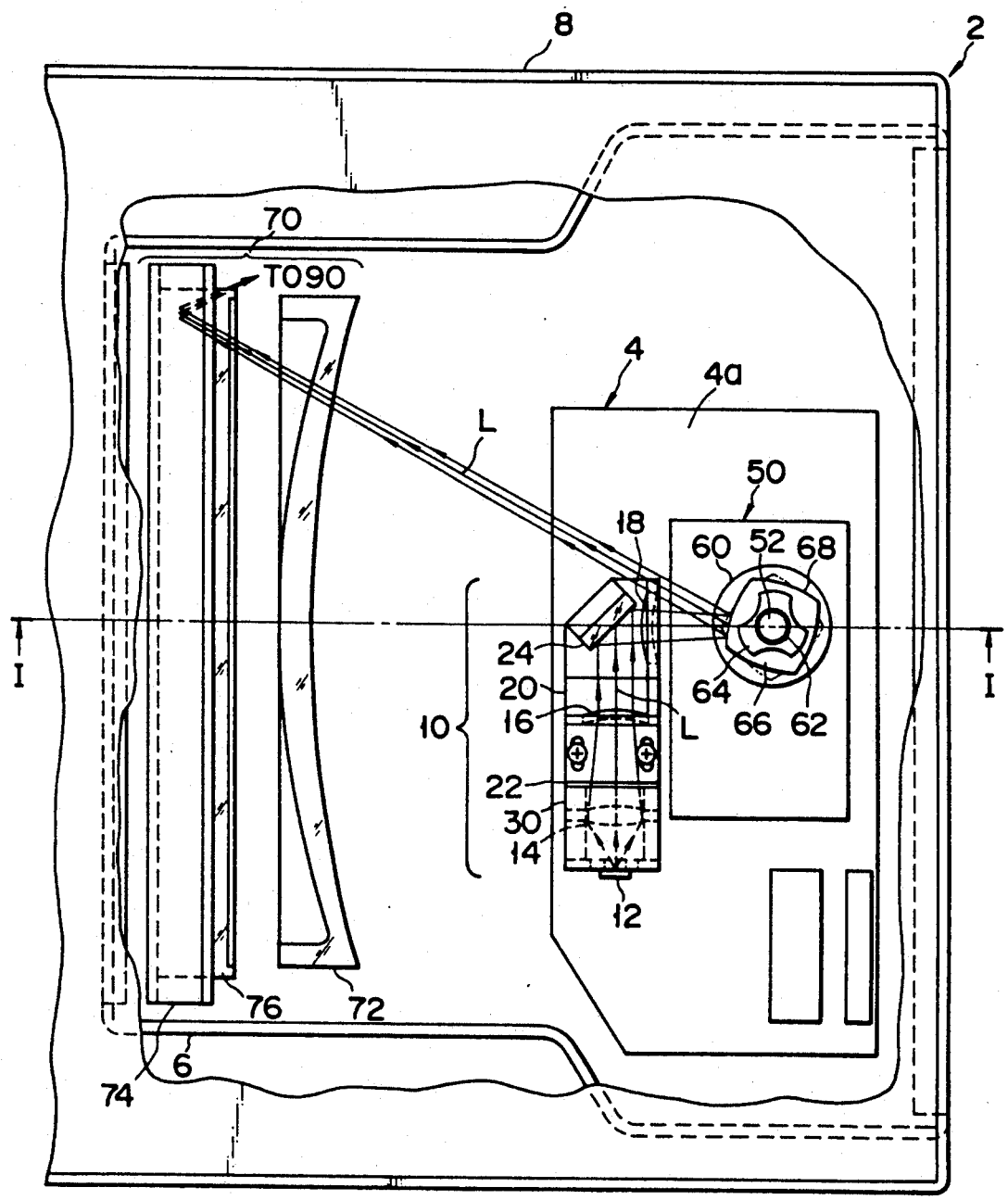
FIG. 1A is a plan view of an optical unit according to one embodiment of the present invention.
Figure 1B:
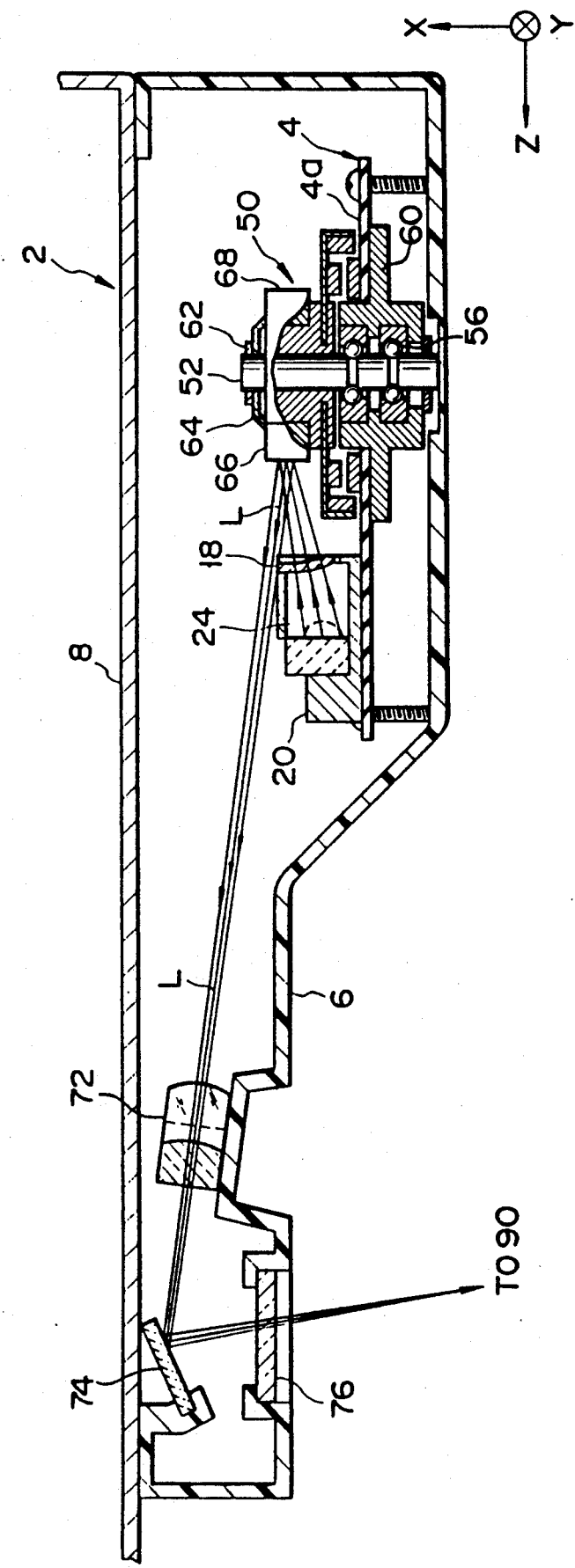
FIG. 1B is a sectional view taken along line I—I in FIG. 1.
Figure 2A:
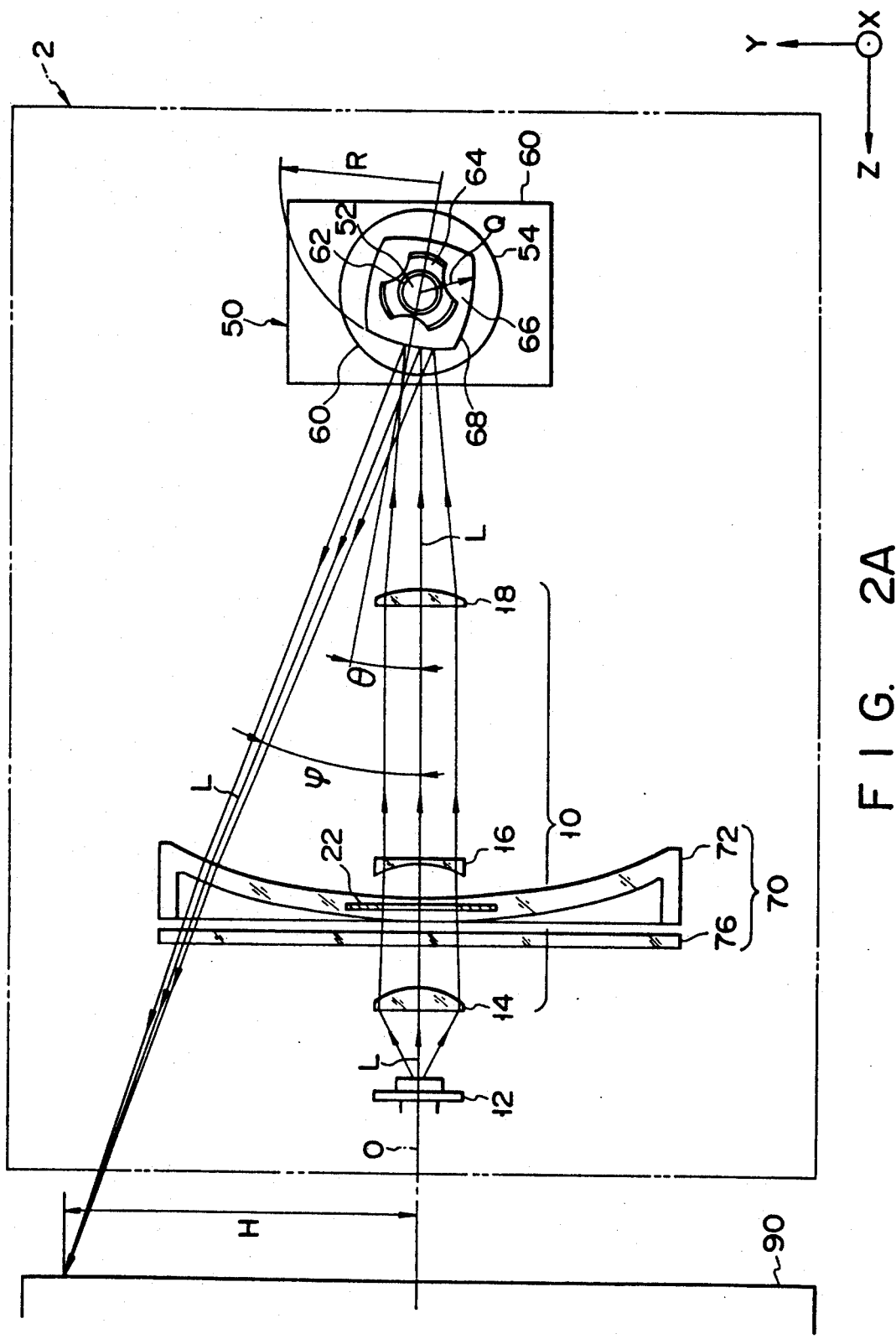
FIG. 2A is a plan view showing the arrangement of optical components of the optical unit, along with laser beam paths.
Figure 2B:
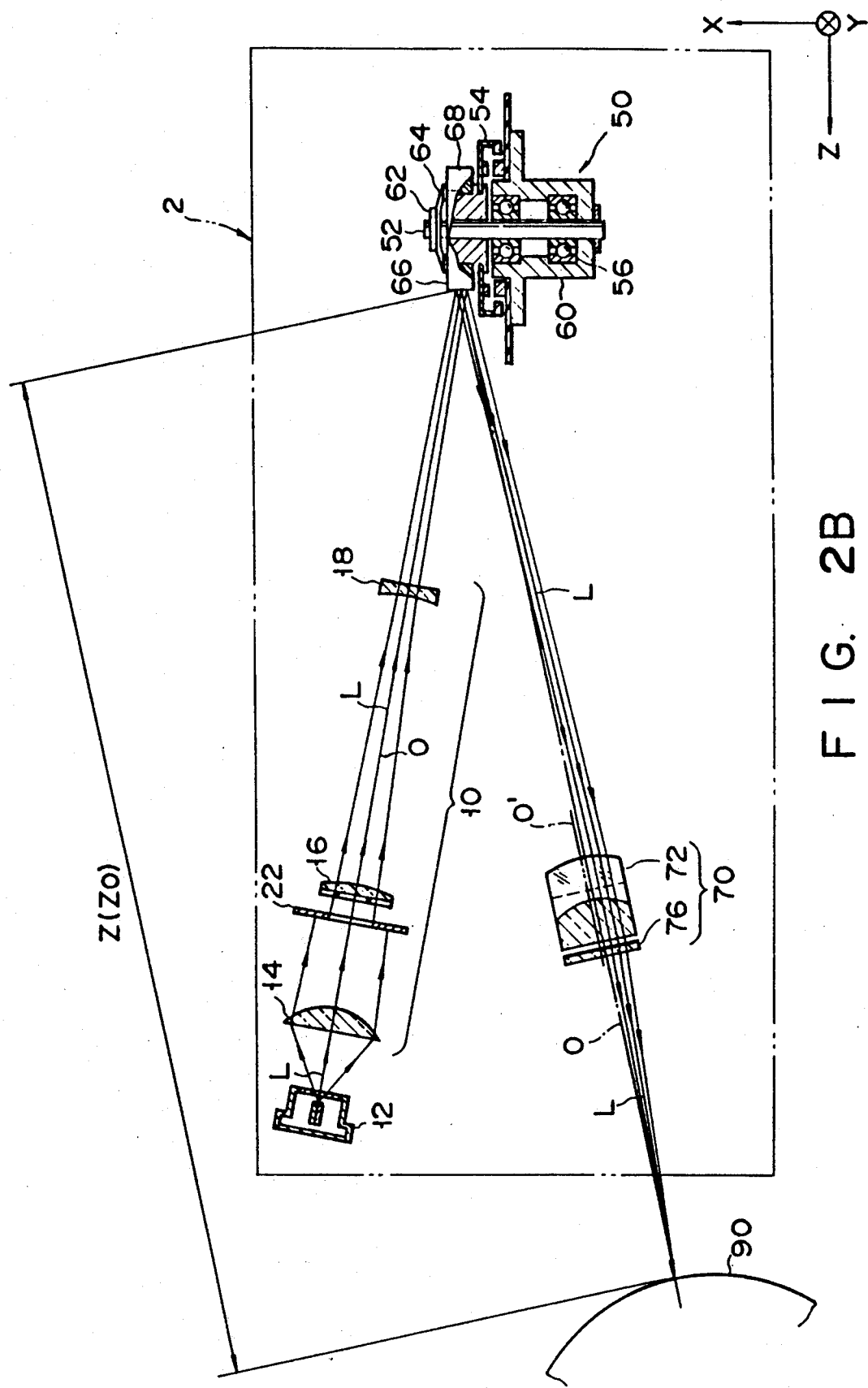
FIG. 2B is a sectional view showing the laser beam paths, the sectional view being obtained by taking the plan view shown in FIG. 2A along a plane which is in the vicinity of a center determined with reference to a main scanning direction.
Figure 4:
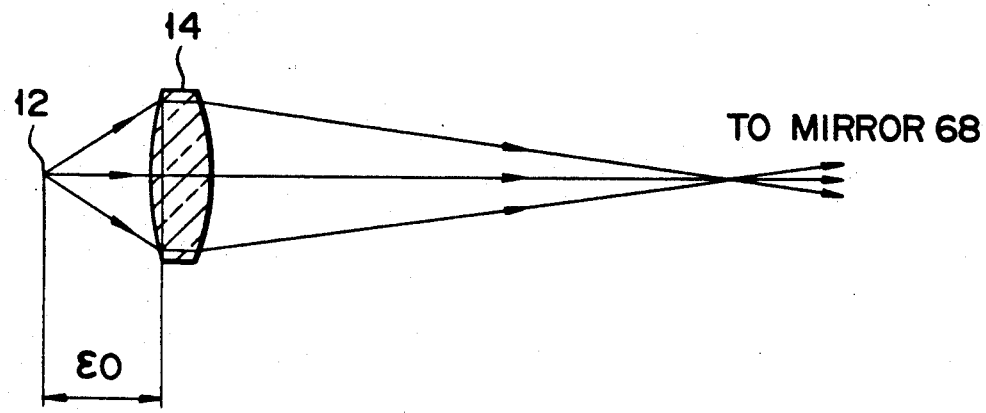
FIG. 4 is a sectional view showing how the focal length of a glass lens is related to the distance between a laser and the glass lens.

As is shown in FIGS. 1A and 1B, an optical unit 2 is provided with an outer housing 6 and a base plate 8. The base plate 8 covers the outer housing 6 and seals the interior of the optical unit 2. The base plate 8 constitutes part of a laser beam printer. The optical unit 2 contains: a laser diode 12 for generating a laser beam L; a laser scanning device 4 made up of a first optical system 10 and a scanner 50 which are integrally arranged; and a second optical system 70. The first optical system 10 includes a group of conversion lenses, while the second optical system 70 includes a group of focusing lenses. Although not shown, the optical unit 2 further contains a monitoring optical device which monitors whether a laser beam L and data signal are horizontally synchronized or not, guided through the first and second optical systems 10 and 70 and used for scanning a photosensitive body 90.

The laser scanning device 4 is mounted on an insulating base 4a. This insulating base 4a need not be used if the outer housing 6 is formed of an insulating material. As is shown in FIGS. 3A-3C, the laser diode 12 and at least one lens of the first optical system 10 are assembled in such a manner 30 as to constitute a lens barrel 30.

The laser beam L generated by the laser diode 12 is converged when it passes through the first optical system 10. The laser beam L is directed to the scanner 50, by which the laser beam L is deflected toward the second optical system 70, for scanning it at a nonuniform angular velocity. The laser beam L should reach the point which is determined by the angle at which the reflecting face of the scanner 50 is rotated to correspond to the desirable point on the surface of the photosensitive body 90, i.e., the distance for which the laser beam L scans the photosensitive body in the main scanning direction from the center of the optical axis to a given point. The laser beam L directed from the second optical system 70 and focused on the photosensitive body 90 is modified or ON-OFF controlled by additional units such as a beam modulator, a data input circuit, etc., (not shown), to thereby supply character data and/or graphics data to the circumferential surface of the photosensitive body 90. Therefore, an electrostatic latent image is formed on the circumferential surface of the photosensitive body 90.

The photosensitive body 90 is rotated in a predetermined direction by a driver (not shown). The electrostatic latent image is formed in accordance with the rotation of the photosensitive body 90. The electrostatic latent image, thus formed, is developed by a developing means (not shown), and is then transferred onto a given transferring material (not shown).

Part of the laser beam L passing through the second optical system 70 is reflected by a horizontal synchronization-detecting mirror (not shown) at each scan performed in the main scanning direction. The reflected laser beam L is guided to a synchronization signal detector (not shown), for the detection of horizontal synchronization.

The first optical system 10 includes: a glass lens 14 which slightly converges the laser beam L produced by the laser diode 12; and first and second plastic lenses 16 and 18 which further converge the laser beam converged by the glass lens 14.

The glass lens 14 is a convex lens formed of optical glass, such as BK7 sk 10, etc. As is seen in FIGS. 3A-3C, it has a flange 14a by means of which it is held to a lens barrel 30. The first plastic lens 16 is formed of, e.g., polymethyl methacrylate (PMMA), etc., and has a toric surface. The toric surface has negative power in the main scanning direction and slightly-negative power in the sub-scanning direction. Although not shown, the first plastic lens 16 has a flange by means of which it is attached to a housing 20. It also has either a positioning-projection or a positioning-recess formed substantially at the center with respect to the main scanning direction.

Like the first plastic lens 16, the second plastic lens 18 is formed of PMMA, etc. It has a toric surface. The toric surface has positive power in the main scanning direction and negative power in the sub-scanning direction. Although not shown, the second plastic lens 18 has a flange by means of which it is attached to the housing 20. It also has either a positioning-projection or a positioning-recess formed substantially at the center with respect to the main scanning direction.

The scanner 50 includes a polygonal mirror 66 having a plurality of deflecting mirror surfaces 68. Each deflecting mirror surface 68 is convex in the main scanning direction, i.e., the deflecting mirror surface 68 is curved with a predetermined radius R of curvature. The number of deflecting mirror surfaces 68 is four, or a multiple of four. The polygonal mirror 66 is driven by an axial gap type motor 60. This motor 60 contains: a rotor 54 which is integral with the rotating shaft 52 of the motor 60; a direct bearing 56 which supports the rotating shaft 52 in such a manner 50 as to allow smooth rotation; etc. The polygonal mirror 66 is reliably fixed to the rotor 54 by means of a stop ring 62 and a spring member 64.

The second optical system 70 includes a third plastic lens 72 for focusing a laser beam L on the surface of the photosensitive body 90, and a dust-preventing cover 76 for sealing the above-mentioned optical members of the optical unit 2. With respect to the main scanning direction, the third plastic lens 72 has a face which is shaped to satisfy the relation expressed by H=fθ. In other words, the distance, over which the laser beam L ought to move from optical axis in the main scanning direction in proportion to the angle θ at which the polygonal mirror 66 or each mirror surface 68 thereof is rotated, is made to correspond to the distance H for which the laser beam L scans the photosensitive body 90 in the main scanning direction from the center of the optical axis. With respect to the subscanning direction, the third plastic lens 72 functions as a kind of fθ lens which has positive power and which is curved such that the power decreases in accordance with an increase in the deflection angle φ with respect to the main scanning direction. Like the first plastic lens 16, the third plastic lens 72 is formed of PMMA, etc., and has either a positioning-projection or a positioning-recess (not shown) formed substantially in the center with respect to the main scanning direction.

The dust-preventing cover 76 is a transparent glass or plastic plate. It is formed of optical glass, such as BK7, filter glass, PMMA, or the like. It has a thickness of 2–3 mm, and permits the laser beam L to pass therethrough. In order to prevent signal components of undesirable wavelengths from reaching the photosensitive body 90, the dust-preventing cover 76 may be provided with a sharp cut filter function.

In the optical unit 2, the first optical system 10 and the second optical system 70 are arranged such that their optical axes form a predetermined angle in a plane expanding in the sub-scanning direction. This arrangement is adopted for the purpose of eliminating ghost laser beam l to be mentioned later.

The laser diode 12 and lenses 14, 16 and 18 of the first optical system 10 are integrally assembled together and are held by the housing 20. The housing 20 contains the lens barrel 30 which will be detailed later with reference to FIGS. 3A–3C. A stop 22 which restricts the intensity or amount of convergent laser beam L, and a first mirror 24 which is arranged between the first and second plastic lenses 16 and 1 to change the traveling direction of the laser beam L, are also held by the housing 20. It should be noted that a second mirror 74 is arranged between the third plastic lens 72 and the dust-preventing cover 76, so as to bend the laser beam L.

The laser beam generated by the laser diode 12 is converged or collimated by the glass lens 14. When passing through the stop 22, the laser beam L is shaped to have a predetermined cross section. The laser beam L emerging from the stop 22 is guided to the first plastic lens 16. When passing through the first plastic lens 16, the laser beam L is collimated in the main scanning direction and is converged in the sub-scanning direction. The laser beam L, thus processed, is then directed to the second plastic lens 18 via the first mirror 24, as is seen in FIGS. 1A and 1B. When passing through the second plastic lens 18, the laser beam L is converged in both the main scanning direction and subscanning direction.

The laser beam L emerging from the second plastic lens 18 is directed to one deflecting mirror surface 68 of the polygonal mirror 66 of the scanner 50. After being reflected by the deflecting mirror surfaces 68, the laser beam L is directed at a nonuniform angular velocity to the third plastic lens 72, which functions as a kind of fθ lens, as mentioned above. In the main scanning direction, the third plastic lens 72 suppresses the adverse effects caused by the field curve and corrects the distortion aberration to have a desirable value. In the sub-scanning direction, the third plastic lens 72 corrects a positional shift of the laser beam L on the photosensitive body 90, even if the each mirror surface 68 of the polygonal mirror 66 tilts.

The laser beam L emerging from the third plastic lens 72 is directed to the photosensitive body 90 by way of the dust-preventing cover 76 which is mounted on the housing 6 of the optical unit 2.

Next, a description will be given of a structure used for converting the laser beam L generated by the laser diode into a laser beam L having a cross section of desirable size.

Referring to FIGS. 3A–3C, the glass lens 14 is secured to the lens barrel 30 by means of a push member 32 and an elastic member 34, e.g., a wave washer, etc. The push member 32 includes a cylindrical portion 32a and a screw portion 32b. The cylindrical portion 32a has a pressing part on that side which contacts the glass lens 14. The position of the glass lens 14 can be adjusted in the direction indicated by arrow A by turning the push member 32. The glass lens 14 has a flange 14a. Since this flange 14a and the pressing part of the cylindrical portion 32a are in line contact with each other, the torque required for turning the push member 32 is small. On the opposite side of the pressing part, a hole 36 is formed in the push member 32. When the position of the glass lens 14 is adjusted, a specially-designed tool is inserted into the hole 36, and the push member 32 is turned by use of the tool. The wave washer 34 urges the glass lens 14 toward the push member 32, and this urging force is constantly applied to the screw portion 32b of the push member 32. Therefore, unnecessary play is not produced between the screw portion 32b of the push member 32 and the ridge of the screw portion 30b of the lens barrel 30. In this fashion, the glass lens 14 is accurately secured to the predetermined position of the lens barrel 30.

The laser diode 12 is fixed to a laser diode holder 40 by means of a screw 42. The position of the laser diode holder 40 can be adjusted in the directions indicated by arrows B and C, so that the laser diode holder 40 can be positioned in a desirable manner with reference to the lens barrel 30. The laser diode holder 40 is pressed against the lens barrel 30 with desirable pressure by means of a spring washer 46, a flat washer 44, and a screw 48. With this structure, the direction in which the major component of the laser beam L of the laser diode 12 is emitted can be easily adjusted with reference to the optical axis of the glass lens 14.

The stop 22 is adhered to the lens barrel 30 such that it is located at the rear-focal plane of the glass lens 14.

Figure 5:
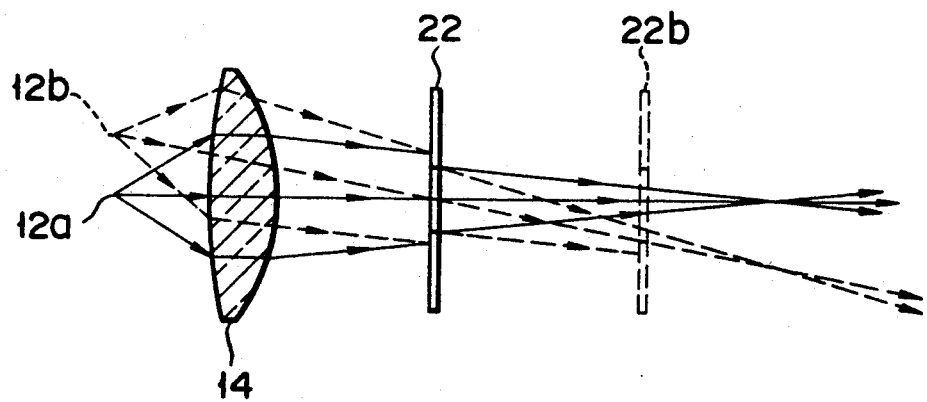
FIG. 5 is a schematic sectional view illustrating the positional relationship between the lens barrel shown in FIGS. 3A–3C and a stop used for restricting the amount of laser beam generated by a laser diode.

Referring to FIG. 5, a laser beam L is generated from the light-output point 12a of the laser diode 12. The laser beam L is converged by the glass lens 14 and restricted by the stop 22 located at the rear-focal plane of the glass lens 14, in such a manner that the laser beam L forms a beam spot of predetermined size. Thereafter, the laser beam L is directed to the photosensitive body 90. Let it be assumed that the stop 22 is located at a position away from the rear-focal plane of the glass lens L, for example, at the position 22b indicated by the broken lines in FIG. 5. In this case, the amount of laser beam L passing through the stop 22 is greatly varied, depending upon the location of the laser-emitting point 12a of the laser diode 12. If the laser-emitting point 12a is shifted to the position indicated by 12b, the amount of laser beam L passing through the stop 22 reduces approximately to half. In other words, in the case where the stop 22 is located at the rear-focal plane of the glass lens 14, the intensity or amount of laser beam L directed to the photosensitive body 90 can remain substantially unchanged, even if the direction in which the major component of the laser beam L generated by the laser diode 12 and the optical axis of the glass lens 14 are shifted from each other.

A description will now be given as to how the characteristics of the laser beam L directed to the photosensitive body 90 from the lens barrel 30 are improved in the present invention.

In this type of optical system, the reflecting mirrors of the scanner may not be held accurately at an intended angle, i.e., a so-called mirror tilting problem. If this happens, the point H to which a laser beam is actually irradiated is shifted from the right position h, due to the curvature of the third plastic lens 72. As a result, the fθ characteristic is adversely affected. In addition, the field curve (image distortion at the point h to which the laser beam should be irradiated) is also adversely affected. In order to improve the fθ characteristics and the field curve, as well as other optical characteristics, the mirror surfaces 68 of the polygonal mirror 66 are provided with an adequate curvature.

For example, the curvature of the each mirror surface 68 in the main scanning direction is represented by the formula below, if the angle of rotation of mirror surfaces 68 is 0°, $$\frac{R}{Z_0} = \frac{1}{\cos\theta} + \frac{\cos\theta}{1 + \cos\theta} - 1$$

where:

$\theta$ is an angle at which the mirror surfaces 68 of the polygonal mirror 66 is rotated;

$Z(Z_\theta)$ is the distance between a given deflection point on a mirror surfaces 68 and the surface of the photosensitive body 90. The subscript $\theta$ of $Z_\theta$ denotes the corresponding angle of rotation of the polygonal mirror 66. If $\theta = 0°$, the above distance is represented by $Z_0$; and R is a radius of curvature of each mirror surface 68.

In connection with the above equation, it should be noted that the value of R $Z_0$ is always greater than 0.5 without reference to the value of $\theta$.

As is well known in the art, where the value of the R $Z_0$ is greater than 0.5, the characteristics of the laser beam, i.e., an image, irradiated onto the photosensitive body are adversely affected. That is, the fθ characteristic, the field curve, the distortion, etc. adversely affected.

The fθ characteristic will be explained. The fθ characteristic is the difference F between the following two: one is position H to which the laser beam L actually reaches and the other is the theoretical position h to which the laser beam L reflected by the mirror surface 68 reaches. That is, the fθ characteristic F is given by:

$$F = \frac{(H - h) \times 100}{h} = \frac{(H - f\theta) \times 100}{f\theta}$$

The fθ characteristic varies from "−" to "+" in accordance with an increase in the absolute value of the angle $\theta$ of rotation of the mirror surfaces 68. The symbols "−" and "+" used with the fθ characteristic indicate how H and h are related to each other in the Y-axis direction, i.e., in the main scanning direction ($\theta > 0$). If H > h, the relationship is "+", and if H < h, the relationship is "−". As may be understood from this, the third plastic lens 72 should be an fθ lens which is specially shaped such that the power of the center portion of the lens is smaller than that of the circumferential portion. However, if such a special type of fθ lens is used, the field curve is inevitably shifted to the side of the polygonal mirror 66, noted the symbol "+", in accordance with an increase in the angle of rotation of the mirror surfaces 68. The symbols "+" and "−" used with the field curve indicate the direction in which the focus of the laser beam L directed to the photosensitive body 90 is shifted from a given reference position. If the focus of the laser beam L is shifted from the theoretical position toward the interior of the photosensitive body 90, the shifting direction is represented by "−". If the focus of the laser beam L is shifted from the theoretical position in the opposite direction, the shifting direction is represented by "+".

In the embodiment of the present invention, the radius of curvature R of each mirror surface 68 is determined as R = 79.65 mm, and the distance $Z_0$ between the deflection point c and the surface of the photosensitive body 90 is determined as $Z_0$ = 187.12 mm. Therefore, the curvature of the mirror surfaces 68 of the polygonal mirror 66 satisfies the relationship $R/Z_0 < 0.5$.

By combining the mirror surfaces 68 and the third plastic lens 72 which satisfy the above equations, the field curve and fθ characteristic can be controlled to have adequate values with reference to the surface of the photosensitive body 90.

Figure 6:
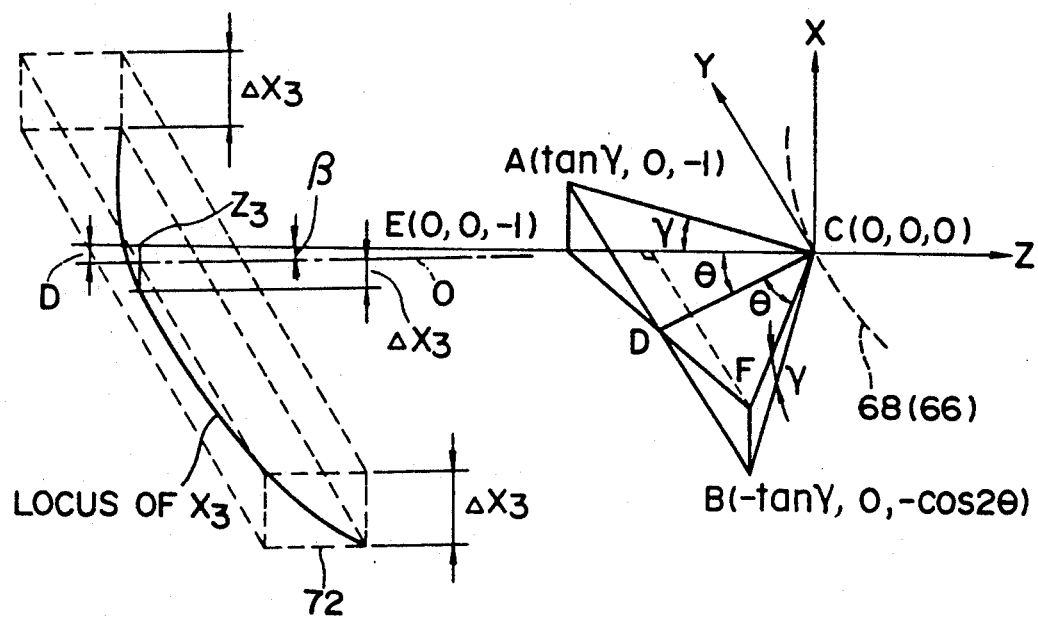
FIG. 6 is a vector diagram showing the characteristics of a laser beam which passes through a scanner incorporated in the optical unit shown in FIGS. 1A and 1B, the characteristics of the laser beam being indicated in relation to the angle formed between a normal line to a mirror and an laser beam incident on the mirror.
Figure 7:
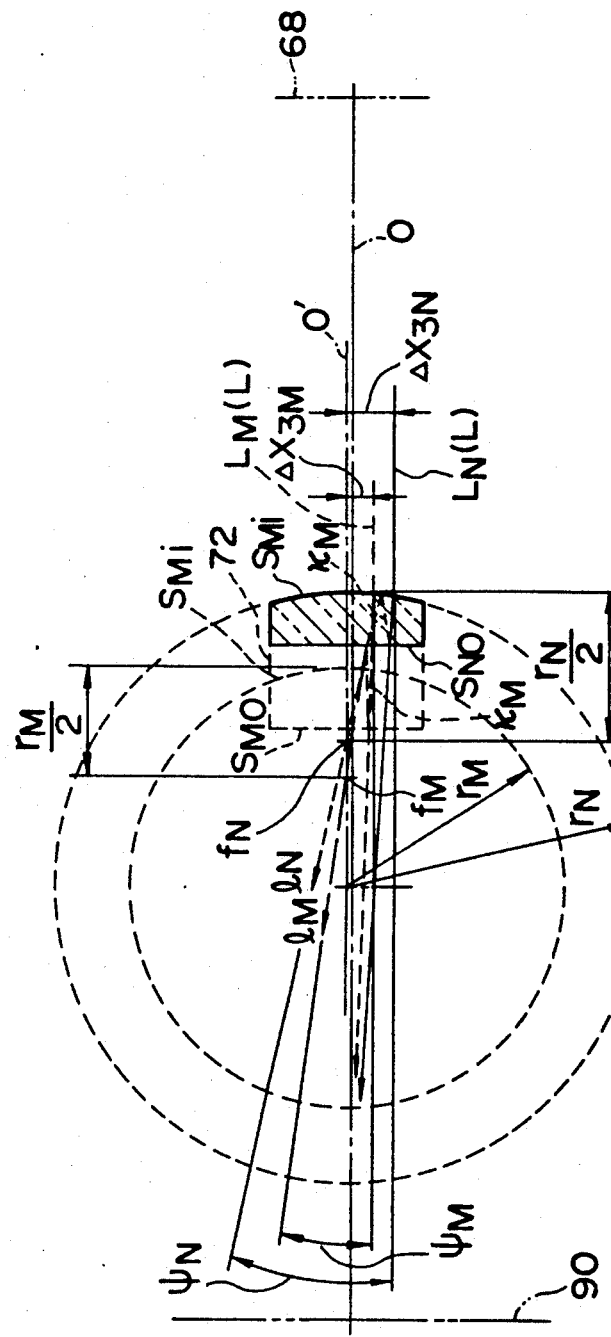
FIG. 7 is a schematic view showing the characteristics of a laser beam incident on a focusing lens incorporated in the optical unit shown in FIGS. 1A and 1B, the characteristics of the laser beam being indicated in relation to a main scanning direction.

FIGS. 6 and 7 illustrate principles based on which the characteristics of the images formed on the photosensitive body are improved by the combination of the mirror surfaces 68 and the third plastic lens 72.

Let it be assumed that a line which is normal to an each mirror surfaces 68 and which passes through the deflection point C (0, 0, 0) is represented by vector $\overline{CD}$, an incident laser beam is represented by vector $\overline{AC}$, and a reflected laser beam which forms angle $\theta$ with reference to vectors $\overline{CD}$ and $\overline{CE}$ is represented by vector $\overline{CB}$ (the length of vector $\overline{CE}$ = the length of vector $\overline{CF}$ = 1), as is shown in FIG. 6. In this case, an image obtained by projecting vector $\overline{CB}$ on an XZ plane is expressed as ($-\tan\gamma$, 0, $-\cos 2\theta$). If the third plastic lens 72 is arranged on the optical axis 0 having an angle $\beta$ with respect to Z axis, and a projection that the position of the third plastic lens 72 on the optical axis 0 is projected onto the Z axis is denoted by $Z_3$, the intersection $X_3$ between the reflected laser beam or projected image (veotor $\overline{CB}$) and the third plastic lens 72 is expressed as follows:

$$X_3 = Z_3 \cdot \frac{\tan\gamma}{\cos 2\theta}$$

As may be understood from the above, the displacement $\Delta X_3$, i.e., the distance from the reflected laser beam to the Z axis decreases (the absolute value of the deviation increases) in accordance with an increase in the angle $\theta$ of rotation of the mirror surfaces 68 ($\theta < \pi/2$). A distance D between the Z axis and the optical axis 0 with respect to the position of the coordinates $Z_3$ is determined by $Z_3 \times \tan\beta$. With this in mind, the third plastic lens 72 is provided with a toric surface which can be rotated about an axis perpendicular to the main scanning plane or a Y axis. By so doing, the laser beam L is prevented from swaying or wavering even if mirror surfaces 68 tilt. In other words, the laser beam L is prevented from shifting from a point which is determined with respect to the sub scanning direction.

Next, a description will be given of the relationship between a ghost laser beam and a position at which the laser beam L is incident on the third plastic lens 72 (the position being expressed as a height or distance for which it is located away from the optical axis).

In general, when a laser beam is incident on the first surface of a third plastic lens, it is refracted at a certain angle in the main scanning direction. The laser beam passes through the second surface of the lens, it is refracted in a direction different from the incident laser beam, directed toward a photosensitive body. It should be noted that part of the laser beam incident on the first surface is reflected by the second surface and is returned to the first surface again. Then, the returned laser beam is reflected again by the first surface. The laser beam which is reflected twice appears as a ghost laser beam falling on the photosensitive body.

As is shown in FIG. 7, the third plastic lens 72 has different curvatures between the portion which is center in the main scanning direction and the portions which are peripheral in the main scanning direction.

The third plastic lens 72 having these different curvatures is arranged such that the optical axis determined with respect to the sub-scanning direction is shifted toward the laser beam incident on each mirror surface 68.

The laser beam L is incident on the third plastic lens 72, the center of which is shifted from the optical axis, such that the beam is shifted from both the optical axis, determined with respect to the sub-scanning direction, by a predetermined distance and the center of the lens 72. When the laser beam L is incident on the first surface of the third plastic lens 72, it is refracted in the X-axis direction (sub-scanning direction) at a certain angle. When the laser beam L emerges from the second surface of the third plastic lens 72, it is again refracted in a direction different from that in which it is refracted by the first surface, and is then directed to the photosensitive body 90. On the other hand, part of the laser beam L incident on the first surface is reflected by the second surface. This reflected laser beam K which is reflected by the first surface again becomes a ghost laser beam l. In the present invention, however, the laser beam K is refracted by the first surface such that it passes through focusing point $f_m$, due to the curvature which is determined for the first surface in the sub-scanning direction. As a result, the ghost laser beam l is separated from the laser beam L. Since the ghost laser beam l is shielded by a ghost shielding device (not shown), it does not reach the photosensitive body 90. In this manner, the ghost laser beam l is eliminated from the location of the photosensitive body 90.

The reason why the ghost laser beam l can be eliminated will be explained in more detail.

As mentioned above, the third plastic lens 72 has different optical characteristics between the portion which is center in the main scanning direction and the portions which are peripheral in the main scanning direction. With respect to this third plastic lens 72, let it be assumed that: subscript M denotes that portion of the lens 72 which is center in the main scanning direction; subscript N denotes those peripheral portions of the lens 72 where the angle of rotation of each mirror 68 is wide; $S_{Mi}$ denotes a surface portion which is center with respect to the main scanning direction and on which a laser beam L is incident; $S_{Ni}$ denotes surface portions which are peripheral with respect to the main scanning direction and on which the laser beam L is incident; $S_{Mo}$ and $S_{No}$ denote surface portions from which the laser beam L emerges; $f_M$ and $f_N$ are focal lengths corresponding to the surface portions $S_{Mi}$ and $S_{Ni}$, respectively; and $r_M$ and $r_N$ are radii determining the curvatures of the surface portions $S_{Mi}$ and $S_{Ni}$, respectively. In this case, the focal lengths $f_M$ and $f_N$ are expressed as follows:

$$f_M = \frac{r_M}{2}$$

$$f_N = \frac{r_N}{2}$$

Let it be also assumed that: $L_M$ denotes a laser beam which passes through a portion located in the vicinity of the optical axis determined with respect to the main scanning direction; $L_N$ denotes a laser beam which passes through peripheral portions determined with respect to the main scanning direction; $l_M$ denotes a ghost laser beam produced by the laser beam L incident in the vicinity of the optical axis determined with respect to the main scanning direction; $l_N$ denotes a ghost laser beam produced by the laser beam L incident on the peripheral portions determined with respect to the main scanning direction; and $\psi_M$ and $\psi_N$ denote angles at which the ghost laser beams $l_M$ and $l_N$ are inclined with reference to the laser beams $L_M$ and $L_N$. In this case, inclination angles $\psi_M$ and $\psi_N$ are given by:

$$\psi_M = 2\frac{\Delta X_{3M}}{r_M}$$

$$\psi_N = 2\frac{\Delta X_{3N}}{r_N}$$

It should be noted that the inclination angles $\psi_M$ and $\psi_N$ are in inverse proportion to the radius r of curvature of each portion of the curved surface of the third plastic lens 72. Therefore, the inclination angle $\psi_M$ of the ghost laser beam $l_M$ is wide in the region where the value of r is small (the regions in the neighborhood of the center determined with respect to the main scanning direction), while the inclination angle $\psi_N$ of the ghost laser beam $l_N$ is narrow in the region where the value of r is large (the region in the neighborhood of the peripheral portions determined with respect to the main scanning direction). It should be also noted that the inclination angles $\psi_M$ and $\psi_N$ are in proportion to the deviation $\Delta X_3$ of the intersection between the optical axis of the third plastic lens 72 and the laser beam L. Therefore, in the case where the third plastic lens 72 has its optical axis shifted in the direction of the deviation, the value of $\Delta X_3$ varies in accordance with a change in the rotating angle $\theta$ of each mirror surface 68 of the polygonal mirror 66. Thus, $|\Delta X_3|$ is small in the portions where r is small, and is large in the portions where r is large.

In the present invention, the optical axis of the third plastic lens 72 is shifted from the major component of the laser beam L, a mentioned above. In this case, the angle between the ghost laser beam l and the laser beam L is large if the absolute value of the displacement $\Delta X_3$ is large ($\Delta X_{3N}$), and is narrow if the absolute value of the displacement $\Delta X_3$ is small ($\Delta X_{3M}$). In other words, the distance $\Delta X_3$ ($\Delta X_{3N}$) between the major component of the laser beam passing through the third plastic lens 72 and the optical axis of the third plastic lens 72 is long in the region where the angle $\theta$ of rotation of each mirror surface 68 of the polygonal mirror 66 is large, whereas the distance $\Delta X_3$ ($\Delta X_{3M}$) between the major component of the laser beam passing through the third plastic lens 72 and optical axis 0' of the third plastic lens 72 is small in the region of the lens center. Therefore, when the laser beam L focused on the photosensitive body 90 is made to move straight line parallel to the main scanning direction, the ghost laser beam l ($l_M$, $l_N$) can be eliminated from even all surface of the third plastic lens 72 while simultaneously suppressing the shifting of the third plastic lens 72.

In regard to the sub-scanning direction, the angle of incidence at which the laser beam L is incident on the third plastic lens 72 is considered substantially 0°, the sectional shape of the laser-emerging side of the third plastic lens 72 can be substantially flat in the sub-scanning direction.

The optical axis of the third plastic lens 72 can be shifted with reference to the major component of the laser beam L in two directions: one is the direction approaching the laser beam directed from the first optical system 10 to the mirror surfaces 68 of the polygonal mirror 66, i.e., the "+" side region which is depicted as being upper in FIGS. 6 and 7; and the other is the opposite direction, i.e., the "−" side direction which is depicted as being lower in FIGS. 6 and 7. In the optical unit 2 of the present invention, the optical axis of the third plastic lens 72 should not be shifted toward the "−" side since the optical axes of the first and second optical systems 10 and 70 form the predetermined angle. If the optical axis of the third plastic lens 72 is shifted in this direction, the value of the displacement $\Delta X_3$ ($\Delta X_{3N}$) has to be increased, so as to isolate the ghost laser beam l from the major component of the laser beam L passing through the third laser beam 72. It should be noted that an increase in the value of the displacement $\Delta X_3$ ($\Delta X_{3M}$) adversely affects the wave front aberration with respect to the photosensitive body 90. Thus, it is desirable in the present invention that the third plastic lens 7 be shifted toward the laser beam L directed from the first optical system 10 to each mirror surface 68.

Figure 8:
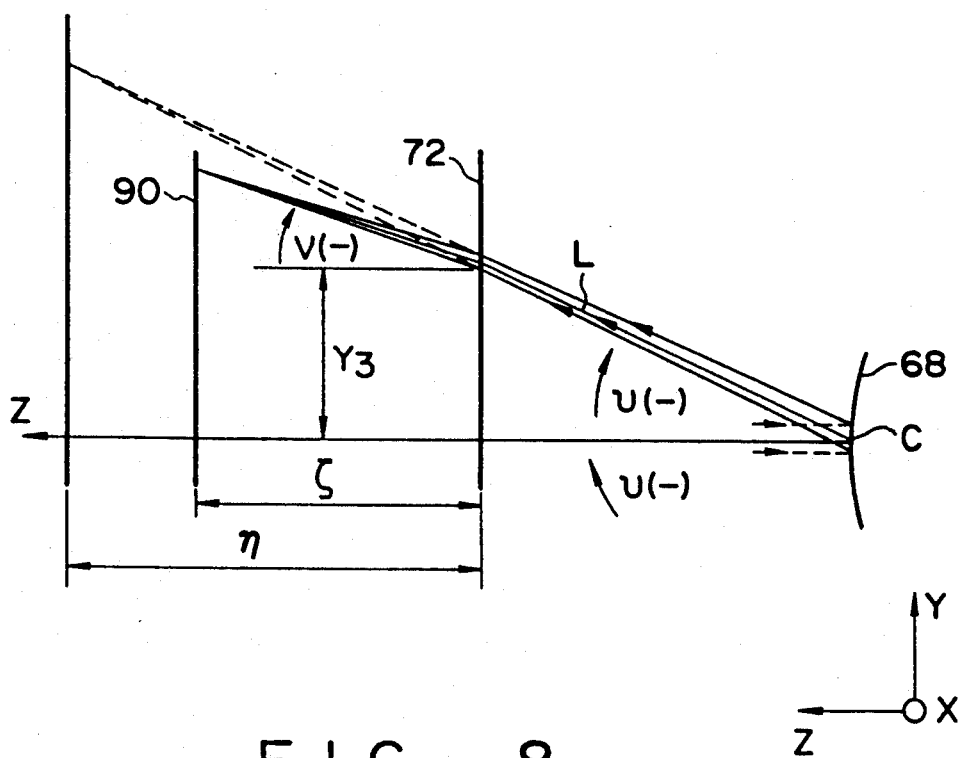
FIG. 8 is a schematic view of optical paths and explains the principle on the basis of which the field curve is corrected by the focusing lens.
Figure 9:
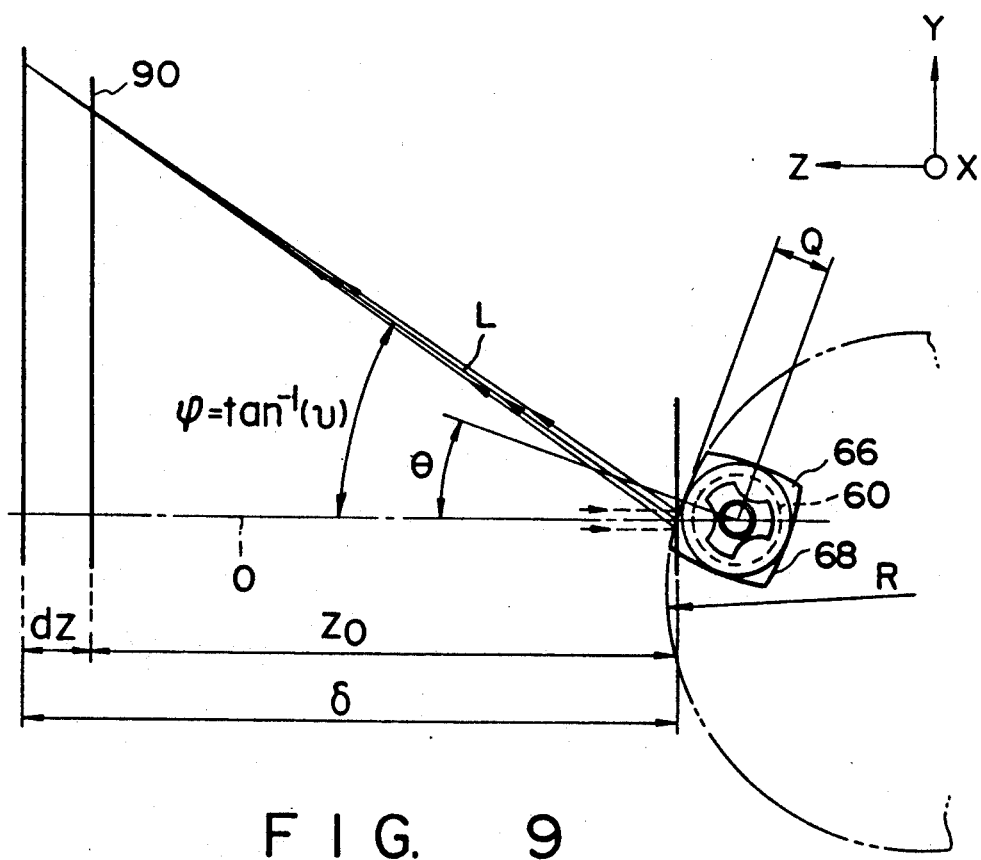
FIG. 9 is a schematic view showing the positional relationship between the focusing lens and a photosensitive body, which are arranged on the basis of the principle shown in FIG. 8.

FIGS. 8 and 9 illustrate principles based on which the characteristics of the images formed on the photosensitive body are improved by the combination of the mirrors and the third plastic lens.

FIG. 8 shows a thin-lens optical system used for determining characteristics of the laser beam L in the optical system shown in FIGS. 1A, 1B, 2A and 2B. In FIG. 8, point C indicates the same deflection point as is shown in FIG. 6, and the surfaces of the third plastic lens 72 and photosensitive body are schematically indi-cated. Reference symbols U and V denote inclination of the laser beam L direction from the deflection point C to the photosensitive body 90 in the YZ plane, and the inclination in the "−" state is indicated in FIG. 8.

With respect to a thin lens, power $P_M(Y_3)$ which is equivalent to the third plastic lens 72 in the main scanning direction and is located at position $Y_3$ ($Y_3>0$) be considered. From a formula established for a thin lens, the following is obtained:

$$V(Y_3) - U(Y_3) = Y_3 \times P_m(Y_3) \tag{1}$$

or $$V(Y_3) \times U(Y_3) + Y_3 P_m(Y_3) \tag{2}$$

By differentiating formula (1) with respect to $Y_3$, the following is obtained:

$$dV(Y_3) - \frac{U(Y_3)}{dY_3} = P_M(Y_3) + Y_3 \cdot \frac{\partial P_M(Y_3)}{\partial Y_3} \tag{3}$$

In FIG. 8, the distance between the third plastic lens 72 and the point to which a laser beam would converge in the absence of the third plastic lens 72 is indicated by $\eta(Y_3)$, and the distance between the third plastic lens 72 and the point to which the laser beam is focused by the third plastic lens 72 is indicated by $\zeta(Y_3)$. It is desirable that the distance $\zeta(Y_3)$ fall within the region between the third plastic lens 72 and the photosensitive body 90 without reference to the value of $Y_3$. Thus, formula (1) or (2) can be rewritten as:

$$\frac{1}{\zeta}(Y_3) = \frac{1}{\eta}(Y_3) + P_M(Y_3) \tag{4}$$

$$P_M(Y_3) = \frac{1}{\zeta}(Y_3) - \frac{1}{\eta}(Y_3) \tag{5}$$

In order for the third plastic lens to have a characteristic expressed by $h = f\theta$, the value of $\{V(Y_3) - U(Y_3)\}$ has to be increased monotonically with an increase in the value of $Y_3$. Thus, the left side of formula (3) has to be larger than 0. That is, it is necessary to satisfy the following relation:

$$P_M(Y_3) + Y_3 \cdot \frac{\partial P_M(Y_3)}{\partial Y_3} > 0 \tag{6}$$

The effects which the environmental conditions, such as the ambient temperature and moisture, may have on the third plastic lens 72 will be considered. In connection with this matter, it is known in the art that the effects which the ambient temperature and/or moisture may have on the third plastic lens 72 is minimum if relation $P_M(Y_3) = 0$ is established in formulas (4) and (5). Therefore, formula (6) can be rewritten as below, provided that the power $P_M(Y_3)$ of the third plastic lens 72 is nearly equal to 0 $\{P_M(Y_3) \approx 0\}$.

$$\frac{\partial P_M(Y_3)}{\partial Y_3} > 0 \tag{7}$$

In connection with formula (5), let it be assumed that $P_M(0) \approx 0$ when $Y_3$ is 0. On the basis of this assumption, the following is obtained:

$$\frac{1}{\zeta}(Y_3) - \frac{1}{\eta}(Y_3) = P_M(Y_3) > 0$$

From this relation, the following is obtained:

$$\frac{1}{\zeta}(Y_3) > \frac{1}{\eta}(Y_3)$$

Hence, $$\zeta(Y_3) < \eta(Y_3)$$

It follows from this relation that a position having a distance $\eta$ in the Z axis direction does not correspond to a position on the photosensitive body 90 having a distance $\zeta$ in the Z axis direction, for every possible value which $\theta$ can take in formula (2). Accordingly, the relation $R/Z_0 < 0.5$ is satisfied.

FIG. 9 shows the arrangement among the polygonal mirror, the third plastic lens and the photosensitive body shown in FIG. 8, along with the relationship between the curvature of the polygonal mirror and the inclination of the laser beam in the YZ plane. Let it be assumed that Q denotes the radius of an imaginary circle which is inscribed in the polygonal mirror 66 and which determines the length of on surface of each mirror surface 68, and that R denotes the radius of an imaginary circle which determines how each mirror surface 68 should be curved in the main scanning direction. In this case, the angle between a laser beam L and YZ plane or inclination U is changed by varying the value of Q/R.

Figure 10:
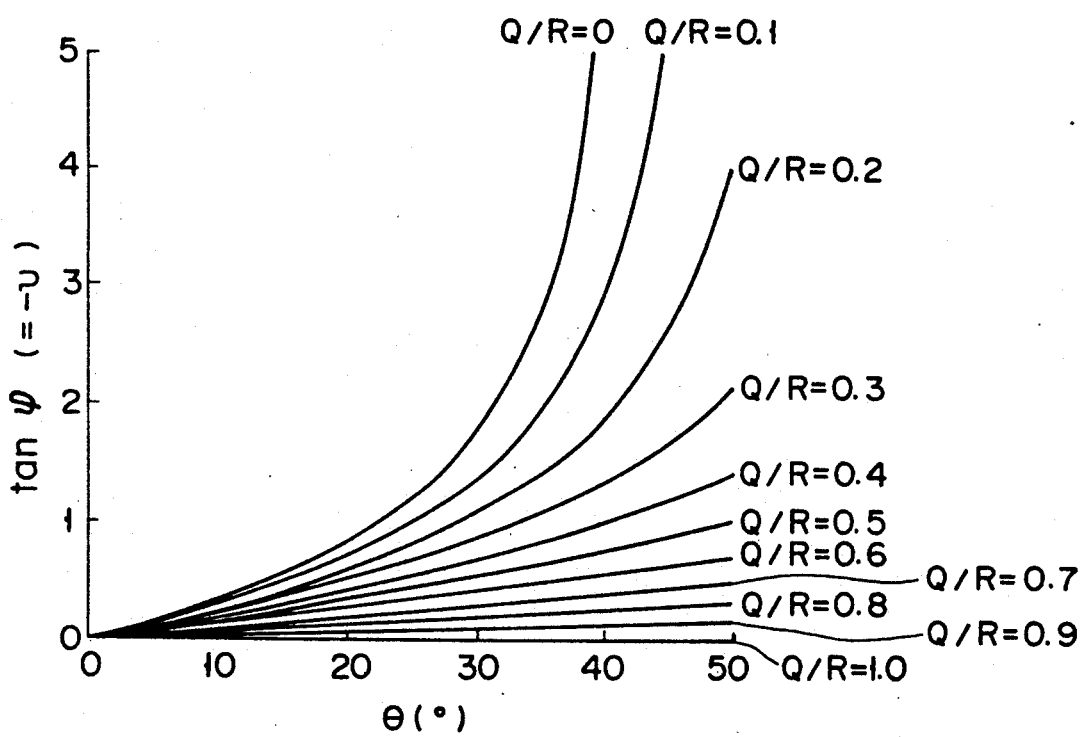
FIG. 10 is a graph showing "tangent $\phi$", a ratio of the rotational angle of a scanner to the deflection angle of the laser beam directed from the scanner to the photosensitive body, with using as a parameter a ratio of the radius of curvature of the mirror of the scanner in the main scanning direction to the radius of an inscribed circle of the mirror.

FIG. 10 shows how the value of U changes in relation to different values of Q/R ("Q" and "R" being indicated in FIG. 9). Where the equation Q/R=0 is established, the mirror surfaces 68 of the polygonal mirror 66 are flat. Where the value of Q/R is 0.4 to 1, the value of U changes linearly. However, the field curve of the laser beam L directed to the photosensitive body 90 has an increased value. Therefore, it is preferable that Q/R be determined within the range of 0.05 to 0.2.

Figure 11A:
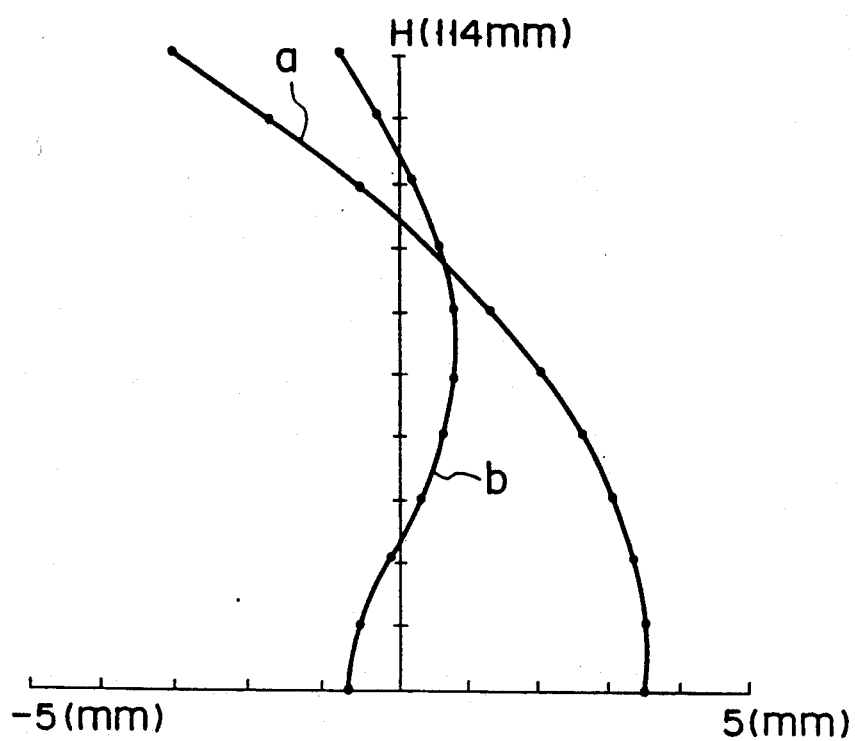
FIGS. 11A and 11B are graphs showing how the field curve and the $f\theta$ characteristic change in relation to the positional relationship among the focusing lens, the mirror and the photosensitive body.
Figure 11B:
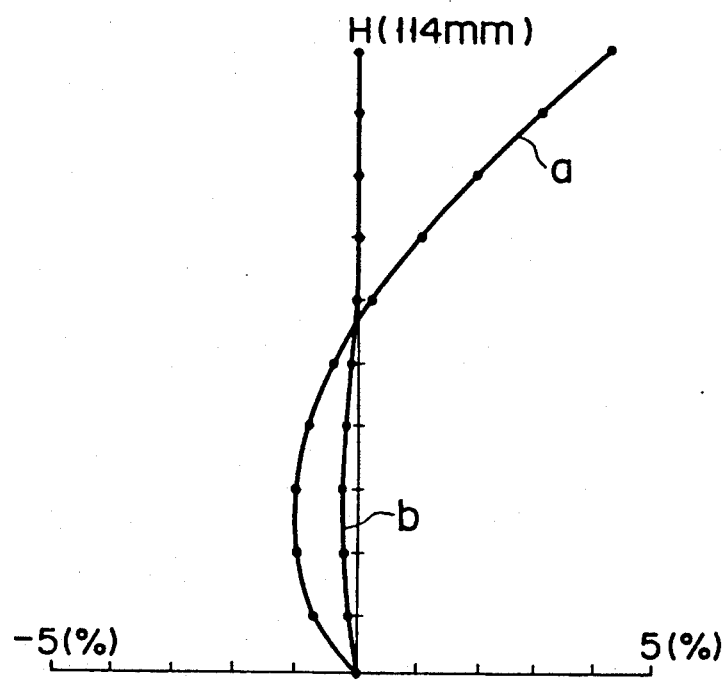

FIGS. 11A and 11B show an example of results obtained by correcting the field curve and/or $f\theta$ characteristics by us of the third plastic lens and the polygonal mirror incorporated in the optical unit shown in FIGS. 1A through 2B. In Figs. 11A and 11B, curves a indicate the characteristics obtained by use only of the polygonal mirror 66, while curves b indicate the characteristics obtained by use of both the polygonal mirror 66 and the third plastic lens 72.

Consideration will now be given to the size of the beam spot $\omega$ (the size of a cross section) which the laser beam L forms on the photosensitive body 90 in the case where the third plastic lens 72 functioning as a kind of an $f\theta$ lens is arranged close to the photosensitive body 90.

It is generally known in the art that the beam spot $\omega$ formed by the laser beam L has a certain intensity distribution. More specifically, the beam spot $\omega$ has a high intensity (bright) in the center thereof, and has a low intensity (dark) in the periphery.

Since the optical unit 2 is incorporated in a laser beam printer or the like, fine powder, such as toner used for visualizing an electrostatic latent image, exists in the neighborhood of the photosensitive body 90. In the case where the third plastic lens 72 is arranged close to the photosensitive body 90, the fine powder may scatter, diffract or shield the laser beam L since this laser beam L is converged to form a minute spot $\omega$ on the photosensitive body 90. Thus, the third plastic lens 72 has to be isolated from the photosensitive body 90 by a certain distance such that a beam spot $\omega$ which does not result in a practical problem can be formed on the photosensitive body even if the laser beam L is scattered, diffracted or shielded.

A decrease, if any, in the energy of the laser beam L, which is expressed as $1/e2$, guided onto the photosensitive body 90 should be within the range of 0 to 15%. As is well known in the art, if the decrease is within that range, a beam spot which does not result in any practical problem can be obtained even if the laser beam L is scattered, diffused or shielded. In the case where the energy distribution of the laser beam L is a normal Gaussian distribution, the diameter of the beam spot $\omega$ has to be approximately 10 times as large as that of a toner particle, so as to maintain the energy decrease within 15%.

Since the diameter of a toner particle is approximately 10 to 20 μm, the beam spot $\omega$ is formed to have a diameter within the range of 100 to 200 μm according to the embodiment.

Consideration will be given to the position at which the third plastic lens 72 should be arranged so as to permit the beam spot $\omega$ on the photosensitive body 90 to have a size which does not result in any problem even if the laser beam L is scattered, diffracted, or shielded.

As mentioned above, the diameter of the beam spot $\omega$ formed on the photosensitive body 90 has to be approximately ten times as long as that of a toner particle. Thus, the beam spot $\omega$ formed on the third plastic lens 72 is required to have an energy radius $\omega_0$ of more than 100 μm. To meet this requirement, the distance $\epsilon_0$ between each mirror 68 of the polygonal mirror 66 and the front-focal plane of the third plastic lens 72 has to be adequately determined (shown in FIG. 8). In connection with this matter it should be noted that the formula below is known in the art, $$Z_0 - \epsilon_0 \geq \frac{\pi \psi_0}{\lambda} \times 0.1$$

where $Z_0$ is the distance between each mirror 68 and the photosensitive body 90; and $\lambda$ is the wavelength of a laser beam L generated by the laser diode 12.

In order for the beam spot $\omega$ on the third plastic lens 72 to have a diameter larger than that of a toner particle, it is necessary to satisfy the following formulas:

$$P_S \approx \frac{1}{Z_0 - \epsilon_0} + \frac{1}{\epsilon_0}$$

$$\epsilon_0 < \frac{10\lambda}{\pi \omega_0} + \frac{1}{Z_0 - \frac{\pi \omega_0}{10\lambda}}$$

It is also known that the size of the beam spot $\omega$ formed on the photosensitive body 90 can be adjusted to have an adequate size by changing the power $P_S$ which the third plastic lens 72 has in the sub-scanning direction. In this case, the third plastic lens 72 has to be arranged at a position which is expressed by:

$$\frac{4}{Z_0} < P_S$$

where $P_S$ is the power which the third plastic lens 72 has with reference to the optical axis determined in the sub-scanning direction and the deflection angle is 0°. If the third plastic lens 72 is arranged at such a position, the laser beam L describes a straight line on the photosensitive body 90, and the fθ characteristic and the field curve can be improved, as was confirmed in the simulations carried out by the present inventor. In order to control the size of the beam spot formed on the photosensitive body 90 by changing the power which the third plastic lens 72 has in the sub-scanning direction, it is necessary to simultaneously satisfy the following formulas:

$$\frac{4}{Z_0} < P_S$$

$$P_S < \frac{10\lambda}{\pi\omega_0} + \frac{1}{Z_0 - \frac{\pi\omega_0}{10\lambda}}$$

$$\epsilon_0 > \frac{Z_0}{2}$$

With the above formulas satisfied, the practical range within which third plastic lens 72 should be arranged can be determined.

Consideration will now be also possible to improve various optical characteristics by changing the curvature of that portion of the third plastic lens which is on the toric surface side and which is located in the vicinity of the center of the optical axis determined in the main scanning direction. Examples of the optical characteristics that can be improved by this method are: the size of the beam spot $\omega$ formed on the photosensitive body 90; the field curve; the fθ characteristic; the mirror tilt correction (the correction which permits the laser beam L to scan the photosensitive body 90 in a straight line, even if the mirror surfaces 68 tilt); etc. Let it be assumed that Z' denotes the locus which represents the shape of the lens center determined with respect to the main scanning direction and which is indicated in relation to the generatrix extending in the main scanning direction on the toric surface side, and those coordinates Y which are perpendicular to both optical axis 0 and optical axis 0' containing lens surface intersections indicate the position corresponding to the Z direction. In this case, a lens satisfying the formula below is known in the art.

$$Z = \frac{C \cdot Y^2}{1 + \sqrt{1 - (C_C + 1) \cdot Y^2}} +$$

$$A_D Y^4 + A_E Y^6 + A_F Y^8 + A_G Y^{10}$$

$A_D$-$A_G$, C and $C_C$ are predetermined constants.

If the absolute value of the mathematical product of C and $Z_0$ (namely, $|C \times Z_0|$) is within a certain range in the case where the above lens is used, the range within which the third plastic lens 72 should be arranged can be determined, as was confirmed in the simulations carried out by the present inventor.

Tables 1–3 show the conditions under which the simulations were carried out. The conditions are shown as Ex1–Ex3, respectively.

| Ex 1 Data on Focusing System (1) | | |
|---|---|---|
| | SURFACE $S_{Mi}$, $S_{Ni}$ | SURFACE $S_{Mo}$, $S_{No}$ |
| r: | 21.7 mm ($P_S$ – 0.0223) | |
| C: | 0.00439 | 0.001743 |
| $C_C$: | 0.755956 | 55.622507 |
| $A_D$: | $-4.35076 \times 10^{-8}$ | $2.7102 \times 10^{-7}$ |
| $A_E$: | $4.33381 \times 10^{-12}$ | $4.01417 \times 10^{-12}$ |
| $A_F$: | $5.92987 \times 10^{-16}$ | $-6.7414 \times 10^{-16}$ |
| $A_G$: | 0 | $-1.32448 \times 10^{-19}$ |

$Z_0 = 186.8$ mm
$R = 69.7$ mm
$|C \cdot Z_0| = 0.82$ $\epsilon_0 = 94.7 > \frac{Z_0}{2} = 93.4$ $P_S = 0.0223 > \frac{4}{Z_0} = 0.0214$ $\frac{10\lambda}{\pi\omega_0} + \frac{1}{Z_0 - \frac{\pi\omega_0}{10\lambda}} = 0.559 > P_S = 0.0223$

| Ex 2 Data on Focusing System (2) | | |
|---|---|---|
| | SURFACE $S_{Mi}$, $S_{Ni}$ | SURFACE $S_{Mo}$, $S_{No}$ |
| r: | 21.531 mm ($P_S$ – 0.0225) | |
| C: | 0.0036998 | |
| $C_C$: | 2.517391 | 51.329831 |
| $A_D$: | $-4.08812 \times 10^{-8}$ | $2.4158 \times 10^{-7}$ |
| $A_E$: | $2.26297 \times 10^{-12}$ | $-4.58107 \times 10^{-12}$ |
| $A_F$: | $2.39365 \times 10^{-16}$ | $-4.50412 \times 10^{-16}$ |
| $A_G$: | $-3.04854 \times 10^{-20}$ | $-4.27538 \times 10^{-21}$ |

$Z_0 = 182.0$ mm
$R = 64.9$ mm
$|C \cdot Z_0| = 0.673$ $\epsilon_0 = 106.8 > \frac{Z_0}{2} = 91.0$ $P_S = 0.0225 > \frac{4}{Z_0} = 0.0220$ $\frac{10\lambda}{\pi\omega_0} + \frac{1}{Z_0 - \frac{\pi\omega_0}{10\lambda}} = 0.561 > P_S = 0.0225$

| Ex 3 Data on Focusing System (3) | | |
|---|---|---|
| | SURFACE $S_{Mi}$, $S_{Ni}$ | SURFACE $S_{Mo}$, $S_{No}$ |
| r: | 20.982 mm ($P_S$ – 0.0231) | |
| C: | 0.003523 | 0.001649 |
| $C_C$: | 2.445556 | 50.838817 |
| $A_D$: | $-4.31048 \times 10^{-8}$ | $2.31330 \times 10^{-7}$ |
| $A_E$: | $2.13030 \times 10^{-12}$ | $-3.99944 \times 10^{-12}$ |
| $A_F$: | $2.80276 \times 10^{-16}$ | $-4.72144 \times 10^{-16}$ |
| $A_G$: | $2.14099 \times 10^{-20}$ | $-1.43564 \times 10^{-20}$ |

$Z_0 = 176.4$ mm
$R = 66.7$ mm
$|C \cdot Z_0| = 0.621$ $\epsilon_0 = 112.0 > \frac{Z_0}{2} = 88.2$ $P_S = 0.0231 > \frac{4}{Z_0} = 0.0227$ $\frac{10\lambda}{\pi\omega_0} + \frac{1}{Z_0 - \frac{\pi\omega_0}{10\lambda}} = 0.564 > P_S = 0.0231$ FIGS. 12A to 12F are graphs showing how the fθ characteristic and the beam spot $\omega$ of the laser beam L converged on the mirror surfaces 68 of the polygonal mirror 66 vary in relation to changes in $|C \times Z_0|$. Of these Figures, FIGS. 12A, 12C and 12E show how the fθ characteristic varies under the conditions indicated in Ex1, Ex2 and Ex3, respectively, and FIGS. 12B, 12D and 12F show how a marginal beam component is converged under the conditions indicated in Ex1, Ex2 and Ex3, respectively.

As was confirmed by conducting many experiments including those shown in Ex1-Ex3, the practical range within which the third plastic lens 72 should be arranged can be determined if $|C \times Z_0|$ is within a certain range.

In Ex1, however, the field curve (not shown) and the $f\theta$ characteristic deteriorates. This means that the value of $|C \times Z_0|$ has an upper limit. Further, in Ex3, the $f\theta$ characteristics (FIG. 12E) and the convergence of a marginal beam component (FIG. 12F) are more improved than those (FIGS. 12A and 12B) in Ex1, but at the same time the field curve (not shown) increases. This means that the value of $|C \times Z_0|$ has a lower limit.

With the above in mind, the practical range of the optimal position of the third plastic lens 72 is determined as follows:

$$0.6 \leq |C \times Z_0| \leq 0.85$$

In the case where the distance $\epsilon_0$ between each mirror 68 of the polygonal mirror 66 and the front-side principal point of the third plastic lens 72 is equal to or smaller than Z0/2, the size of the beam spot $\underline{\omega}$ formed on the beam-input side ($S_{Mi}$, $S_{Ni}$) of the third plastic lens 72 varies greatly, thus preventing the laser beam L directed toward the photosensitive body 90 from converging at one point. As a result, the beam spot $\underline{\omega}$ of the laser beam L directed onto the photosensitive body 90 is blurred, or the focusing position on the photosensitive body 90 varies irregularly.

Where $\epsilon_0$ is larger than $Z_0/2$, the third plastic lens 72 can be the set at an optimal position where it allows the beam spot $\underline{\omega}$ of the laser beam L and the $f\theta$ characteristic to be within practical ranges.

As described above, the optical unit 2 of the present invention includes a combination of: a kind of an $f\theta$ lens having a toric surface; and a scanner unit having a polygonal mirror whose reflecting mirror surfaces are convex in the main scanning direction and are flat in the sub-scanning direction. With this structure, various optical characteristics, including the field curve and the $f\theta$ characteristics, can be improved.

As may be understood from the foregoing, the entire optical unit of the present invention is small in size. In addition, since the lenses incorporated in the unit can be worked in a simplified process, the optical unit can be manufactured at low cost by use of low-in-price optical members.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical unit, comprising:
   means for reflecting a light beam toward an object to be scanned, said reflecting means including a rotatable reflecting face curved in a main scanning direction; and
   guide means for guiding the reflected light beam to the object in correspondence to a retating angle of the reflecting face while simultaneously shaping the reflected light beam to have a cross section of a predetermined diameter, said guide means being arranged between the reflecting means and the object to be scanned and having a toric surface which is rotation-symmetric with reference to an axis extending in the main scanning direction wherein the reflecting face has a cross section which is convex toward the object and which satisfies the formula below:

$$R < 0.5Z_0$$

where R is the maximum radius of curvature, and $Z_0$ is the shortest optical distance between a point of reflection and the surface of the object to be scanned.

2. An optical unit according to claim 1, wherein said guide means includes a lens has a concave section in a plane expanding in the main scanning direction and is convex in a plane expanding in a sub-scanning direction.

3. An optical unit according to claim 2, wherein the lens of said guide means satisfies a condition expressed by:

$$P_M(Y_3) + Y_3 \cdot \frac{\partial P_M(Y_3)}{\partial Y_3} > 0$$

where
$Y_3$ is a coordinate indicating a position to which the light beam is guided in the main scanning direction, and
$P_M(Y_3)$ is power which the lens has at the position corresponding to the coordinate $Y_3$.

4. An optical unit according to claim 2, wherein the lens of said guide means satisfies a condition expressed by:

$$\frac{4}{Z_0} < P_S < \frac{10\lambda}{\pi\omega_0} + \frac{1}{Z_0 - \frac{\pi\omega_0}{10\lambda}}$$

$$\epsilon_0 > \frac{Z_0}{2}$$

where:
$Z_0$ is the optical distance between a point of reflection on the reflecting means and the surface of the object to be scanned;
$\epsilon_0$ is the distance between the point of reflection on the reflecting means and a front-side principal point of the lens;
$\omega_0$ is a radius, measured in the sub-scanning direction, of a beam spot which the light beam forms on the objected to be scanned;
$\lambda$ is a wavelength of the light beam; and
$P_S$ is power which the lens has with respect to an optical axis determined in the sub-scanning direction.

5. An optical unit according to claim 2, wherein the lens of the guide means satisfies a condition expressed by:

$$0.6 \leq |C \times Z_0| \leq 0.85$$

where:
$Z_0$ is the shortest optical distance between a point of reflection on the reflecting means and the surface of the object to be scanned; and
C is the curvature of the toric surface of the lens.

6. An optical unit according to claim 2, wherein the lens of the guide means satisfies a condition expressed by:

$$Z_0 - \epsilon_0 \geq \frac{\pi\omega_0}{10\lambda}, \text{ and}$$

$$\epsilon_0 > \frac{Z_0}{2}$$

where:
- $Z_0$ is the shortest optical distance between a point of reflection on the reflecting means and the surface of the object to be scanned;
- $\epsilon_0$ is the distance between the point of reflection on the reflecting means and a front-focal plane of the lens;
- $\omega_0$ is a radius, measured in the sub-scanning direction, of a beam spot which the light beam forms on the objected to be scanned; and
- $\lambda$ is a wavelength of the light beam.

7. An optical unit, comprising:
means for reflecting a light beam toward the object in accordance with rotation of the reflecting faces, said reflecting means including rotatable reflecting faces which are convex in the main scanning direction toward an object to be scanned and the number of which is four or a multiple of four
means guide for guiding the reflected light beam to the object in correspondence to a rotating angle of a reflecting face while simultaneously shaping the reflected light beam to have a cross section of a predetermined diameter, said guide means, arranged between the reflecting means and the object, having a toric surface which is rotation-symmetric with reference to an axis extending in the main scanning direction, and a lens whose section is concave in a plane expanding in the main scanning direction and is convex in a plane expanding in a sub-scanning direction and which satisfies a condition expressed by:

$$P_M(Y_3) + Y_3 \cdot \frac{\partial P_M(Y_3)}{\partial Y_3} > 0$$

where
- $Y_3$ is a coordinate indicating a position to which the light beam is guided in the main scanning direction, and
- $P_M(Y_3)$ is power which the lens has at the position corresponding to the coordinate $Y_3$.

8. An optical unit, comprising:
means for reflecting a light beam toward the object in accordance with rotation of the reflecting faces, said reflecting means including rotatable reflecting faces which are convex in the main scanning direction toward an object to be scanned and the number of which is four or a multiple of four; and
guide means for guiding the reflected light beam to the object in correspondence to a rotating angle of a reflecting face while simultaneously shaping the reflected light beam to have a cross section of a predetermined diameter, said guide means, arranged between the reflecting means and the object, having a toric surface which is rotation-symmetric with reference to an axis extending in the main scanning direction and a lens whose section is concave in a plane expanding in the main scanning direction and is convex in a plane expanding in a sub-scanning direction and which satisfies a condition expressed by:

$$\frac{4}{Z_0} < P_S < \frac{10\lambda}{\pi\omega_0} + \frac{1}{Z_0 - \frac{\pi\omega_0}{10\lambda}}$$

$$\epsilon_0 > \frac{Z_0}{2}$$

where:
- $Z_0$ is the shortest optical distance between a point of reflection on the reflecting means and the surface of the object to be scanned;
- $\epsilon_0$ is the distance between the point of reflection on the reflecting means and a front-focal plane of the lens;
- $\omega_0$ is a radius, measured in the sub-scanning direction, of a beam spot which the light beam forms on the objected to be scanned;
- $\lambda$ is a wavelength of the light beam; and
- $P_S$ is power which the lens has with respect to an optical axis determined in the sub-scanning direction.

9. An optical unit, comprising:
means for reflecting a light beam toward the object in accordance with rotation of the reflecting faces, said reflecting means including rotatable reflecting faces which are convex in the main scanning direction toward an object to be scanned and the number of which is four or a multiple of four; and
guide means for guiding the reflected light beam to the object in correspondence to a rotating angle of a reflecting face while simultaneously shaping the reflected light beam to have a cross section of a predetermined diameter, said guide means, arranged between the reflecting means and the object, having a toric surface which is rotation-symmetric with reference to an axis extending in the main scanning direction, said guide means including a lens whose section is concave in a plane expanding in the main scanning direction and is convex in a plane expanding in a sub-scanning direction and which satisfies a condition expressed by:

$$0.6 \leq |C \times Z_0| \leq 0.85$$

where:
- $Z_0$ is the shortest optical distance between a point of reflection on the reflecting means and the surface of the object to be scanned; and
- $C$ is the curvature of the toric surface of the lens.

10. An optical unit comprising:
means for reflecting a light beam toward the object in accordance with rotation of reflecting faces, said reflecting means including rotatable reflecting faces which are convex in the main scanning direction toward an object to be scanned and the number of which is four or a multiple of four; and
guide means for guiding the reflected light beam to the object in correspondence to a rotating angle of the reflecting face while simultaneously shaping the reflected light beam to have a cross section of a predetermined diameter, said guide means, arranged between the reflecting means and the object, having a toric surface which is rotation-symmetric with reference to an axis extending in the main scanning direction and a lens whose section is concave in a plane expanding in the main scanning direction and is convex in a plane expanding in sub-scanning direction and which satisfies a condition expressed by:

$$Z_0 - \epsilon_0 \geq \frac{\pi \omega_0}{10\lambda}, \text{ and}$$

$$\epsilon_0 > \frac{Z_0}{2}$$

where:

$Z_0$ is the shortest optical distance between a point of reflection on the reflecting means and the surface of the object to be scanned;

$\epsilon_0$ is the distance between the point of reflection on the reflecting means and a front-focal plane of the lens;

$\omega_0$ is a radius, measured in the sub-scanning direction, of a beam spot which the light beam forms on the objected to be scanned; and $\lambda$ is a wavelength of the light beam.

* * * * *